No. 755,537. PATENTED MAR. 22, 1904.
F. PORSCHE & L. LOHNER.
COIL FOR DYNAMO ELECTRIC MACHINES.
APPLICATION FILED JULY 11, 1902.
NO MODEL.
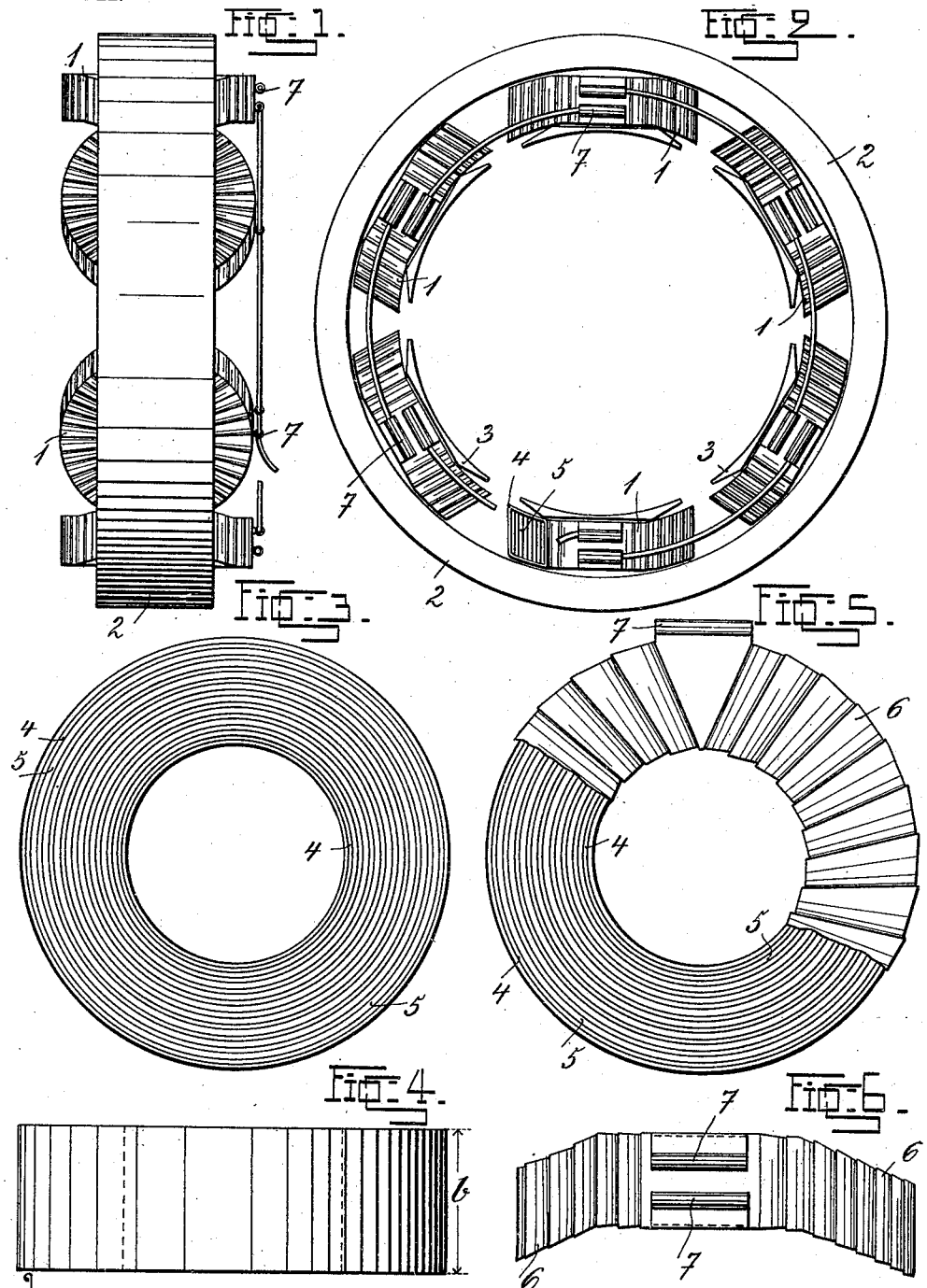
WITNESSES. INVENTORS,
Ferdinand Porsche,
and Ludwig Lohner,
by Gartner & Steward,
Attorneys.

No. 755,537. Patented March 22, 1904.

UNITED STATES PATENT OFFICE.

FERDINAND PORSCHE AND LUDWIG LOHNER, OF VIENNA, AUSTRIA-HUNGARY.

COIL FOR DYNAMO-ELECTRIC MACHINES.

SPECIFICATION forming part of Letters Patent No. 755,537, dated March 22, 1904.

Application filed July 11, 1902. Serial No. 115,204. (No model.)

*To all whom it may concern:*

Be it known that we, FERDINAND PORSCHE, engineer, residing at 6 Berggasse, and LUDWIG LOHNER, manufacturer, residing at 2 Porzellangasse Vienna IX, Austria-Hungary, subjects of the Emperor of Austria-Hungary, have invented certain new and useful Improvements in and Relating to Coils for Dynamo-Electric Machines, of which the following is a specification.

The present invention consists in a method of manufacturing coils for the field-magnets of dynamo-electric machines, whereby besides the attainment of other advantages the coils can be simply and quickly manufactured at a very reduced cost.

In the accompanying drawings, Figures 1 and 2 illustrate in side and front elevation, respectively, the field-magnets of a dynamo-electric machine provided with the improved coils; and Figs. 3 to 6 illustrate the method of manufacturing the coils.

As is well known, the cylindrical spools or coils of the field-magnet 3 of a dynamo-electric machine have a concavo-convex outline when seen from the side, whereby they are enabled to lie close to the circumference of the ring 2 in surrounding disposition to the field of movement of the revolving armature. According to the present invention these spools are made up of a metallic band or strip (preferably of copper) instead of wire, bound together with an insulating-band separating each two adjoining metallic layers, the whole being wound upon a suitable core. 4 designates the metallic band, and 5 the insulating-tool. As thus wound the coil has the shape shown in Figs. 3 and 4. Thereupon in order to acquire the concavo-convex shape, so as to lie properly in the ring 2 of the field, each coil is cut away, as shown in Fig. 6. The whole is then wrapped by an insulating-covering 6, as shown in Fig. 5, leaving only the terminals 7, serving for electrical connection, protruding. It is preferred to carry out the winding under a comparatively high temperature in order to obtain a close and intimate adhesion between the several layers.

Having thus fully described our invention, what we claim as new, and desire to secure by Letters Patent, is—

1. The process of manufacturing spools or coils for dynamo-electric machines out of a metallic band and a band of insulating material which consists in winding the said bands in laminated arrangement together into the form of a coil, and thereafter cutting away the superfluous portions of the same in order to give the coil the required concavo-convex form, substantially as described.

2. The process of manufacturing spools or coils for dynamo-electric machines out of a metallic band and a band of insulating material which consists in winding the said bands in laminated arrangement together into the form of a coil, and at a temperature higher than the atmospheric temperature, and thereafter cutting away the superfluous portions of the same in order to give the coil the required concavo-convex form, substantially as described.

In testimony whereof we have hereunto set our hands in presence of two subscribing witnesses.

FERDINAND PORSCHE.
LUDWIG LOHNER.

Witnesses:
FRANZ REICHNER,
ALVESTO S. HOGUE.